(12) United States Patent
Soga et al.

(10) Patent No.: US 7,512,550 B2
(45) Date of Patent: Mar. 31, 2009

(54) ELECTRONIC COMMERCE SYSTEM USING MOBILE TERMINAL AND ELECTRONIC COMMERCE METHOD

(75) Inventors: Kenji Soga, Tokyo (JP); Shohei Takeuchi, Tokyo (JP); Yukiko Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 531 days.

(21) Appl. No.: 10/920,392

(22) Filed: Aug. 18, 2004

(65) Prior Publication Data
US 2005/0044006 A1 Feb. 24, 2005

(30) Foreign Application Priority Data
Aug. 22, 2003 (JP) ............... 2003-298359

(51) Int. Cl.
*G06Q 30/00* (2006.01)
*G06F 17/30* (2006.01)
(52) U.S. Cl. .......................... 705/26; 705/27
(58) Field of Classification Search .......... 705/1, 705/26–27
See application file for complete search history.

(56) References Cited

U.S. PATENT DOCUMENTS

| 6,507,727 | B1 * | 1/2003 | Henrick ............... 455/3.06 |
| 2001/0034659 | A1 * | 10/2001 | Kobayashi ............ 705/26 |
| 2002/0007460 | A1 * | 1/2002 | Azuma ................. 713/201 |
| 2002/0069134 | A1 * | 6/2002 | Solomon .............. 705/26 |
| 2002/0123970 | A1 | 9/2002 | Ludtke et al. |

FOREIGN PATENT DOCUMENTS

| JP | 2000-99585 | 4/2000 |
| JP | 2000-196678 | 7/2000 |
| JP | 2001-209532 | 8/2001 |
| JP | 2001-265972 | 9/2001 |
| JP | 2001-282562 | 10/2001 |

(Continued)

OTHER PUBLICATIONS

"Mobile commerce agents in WAP-based services". Matskin, Mihhail; Tveit, Amund. Journal of Database Management v12n3 pp. 27-35. Jul.-Sep. 2001 [recovered from Dialog database Oct. 15, 2008].*

(Continued)

*Primary Examiner*—Jeffrey A. Smith
*Assistant Examiner*—William J. Allen
(74) *Attorney, Agent, or Firm*—Dickstein Shapiro LLP

(57) ABSTRACT

An electronic commerce system and an electronic commerce method for conducting electronic commerce making good use of characteristics of a mobile terminal. A mobile terminal provides authorization for a mobile commerce agent (MCA) to conduct electronic commerce for the terminal and notifies the MCA of information on the authorization. A commerce server notifies the MCA of information as to procedures for the electronic commerce. The MCA, at which the line of the mobile terminal may terminate, stores the electronic commerce procedure information received from the commerce server and the authorization information received from the mobile terminal. In response to a request from the mobile terminal, the MCA carries out the procedures for the electronic commerce which the MCA has the authorization to conduct according to the authorization information received from the mobile terminal based on the electronic commerce procedure information.

29 Claims, 12 Drawing Sheets

FOREIGN PATENT DOCUMENTS

| | | |
|---|---|---|
| JP | 2002-56337 | 2/2002 |
| JP | 2002-149908 | 5/2002 |
| WO | WO 03/014972 A2 | 2/2003 |

OTHER PUBLICATIONS

Karunanithi et al., "Building Flexible Mobile Applications for Next Generation Enterprises", Research Challenges, 2000. Proceedings Academia/Industry Working Conference on Buffalo, NY, U.S.A., IEEE Comput. Soc., U.S., pp. 127-132 (Alamitos, CA, U.S.A.), Apr. 2000.

Lan et al., "A mobile e-commerce solution", Multimedia Software Engineering, 2000. Proceedings. International Symposium on Taipei, Taiwan, Dec. 11-13, 2000. Los Alamitos, CA, U.S.A., IEEE Comput. Soc., U.S., pp. 215-222, Dec. 2000.

Tomoyuki Tatasuno, "Oracle 7.3 for Windows NT 4.0", Oracle Life, B.N.N. Company, Limited, vol. 1, No. 7, pp. 56-59 (Dec. 13, 1996).

* cited by examiner

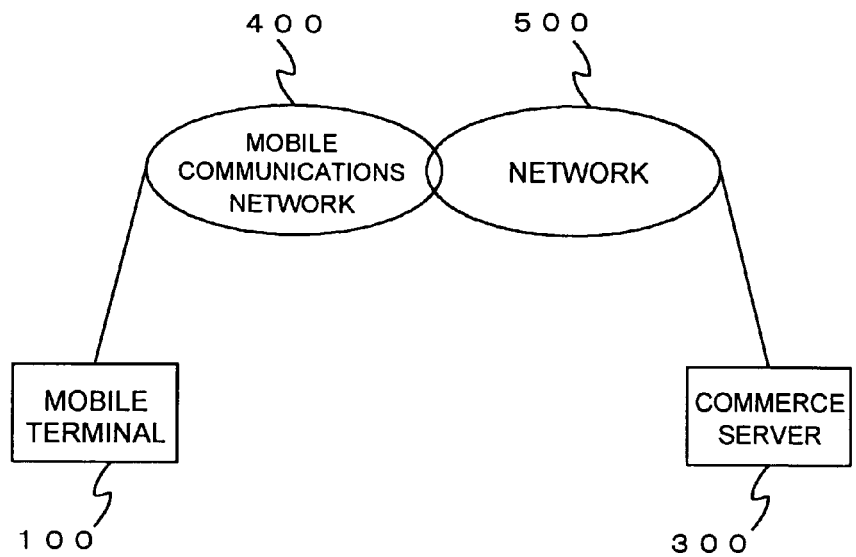
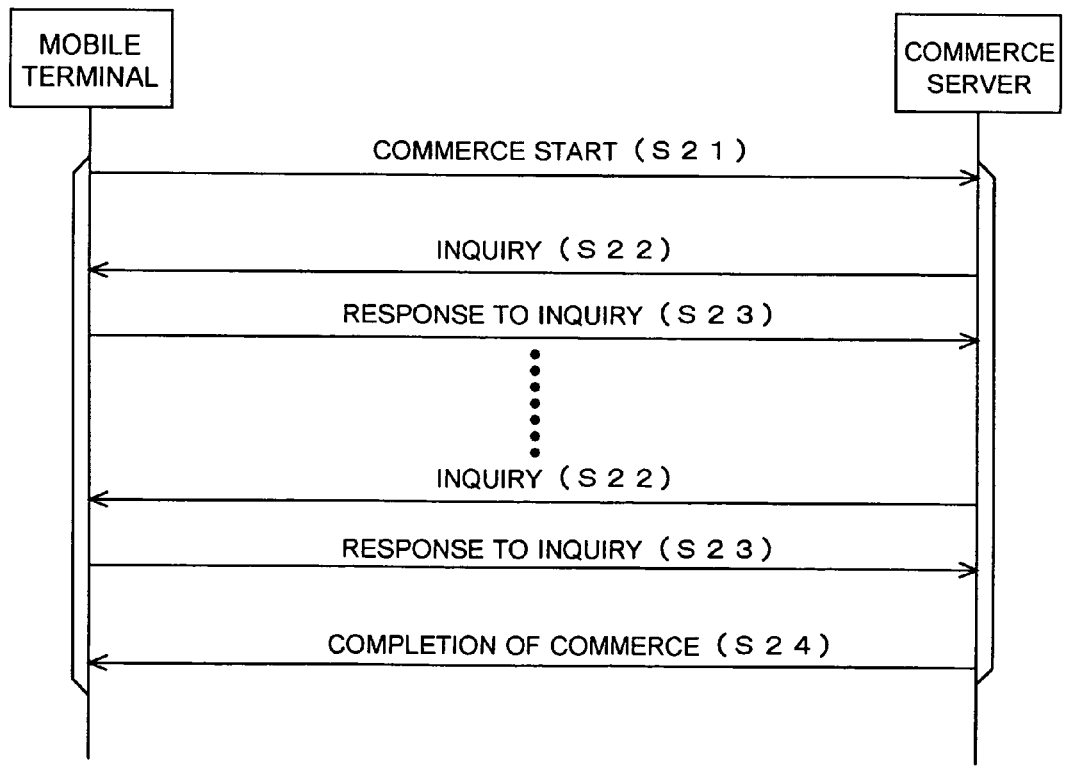

ELECTRONIC COMMERCE SYSTEM USING MOBILE TERMINAL AND ELECTRONIC COMMERCE METHOD

FIELD OF THE INVENTION

The present invention relates to an electronic commerce system and an electronic commerce method for conducting electronic commerce through the use of a mobile terminal, and in more particular, to an electronic commerce system and an electronic commerce method to ensure that electronic commerce is conducted through a mobile communications network.

BACKGROUND OF THE INVENTION

In conventional electronic commerce, a terminal of a customer has been required to be capable of communicating with a commerce server during the period from the start to end of the commerce.

On the other hand, a mobile terminal is characterized in that it is normally not connected with a mobile communications network so as to reduce electric power consumption as well as promoting effective use of radio resources, and is connected to the network at an arbitrary time and place in response to a call from a base station or at its user's request.

In the case of conducting electronic commerce by use of a mobile terminal, the mobile terminal may be connected with a mobile communications network only for the duration required in the electronic commerce such that a user can order an article before moving and receive the article at the place where he/she has gone.

Besides, a mobile terminal is frequently disconnected form a mobile communications network unexpectedly.

FIG. 1 is a diagram showing the configuration of a conventional electronic commerce system using a mobile terminal. FIG. 2 is a sequence diagram showing the sequence of operation of the electronic commerce system depicted in FIG. 1. In FIG. 2, a mobile terminal of a customer is connected to a commerce server at the commencement of electronic commerce. Thereafter, the electronic commerce is conducted.

After the electronic commerce is initiated (step S21), the commerce server successively requests relevant information from the user of the mobile terminal (step S22). In response to the requests, the mobile terminal transmits information input by the user to the commerce server (step S23).

By repetition of such communication exchanged between the commerce server and the mobile terminal, the electronic commerce is concluded (step S24).

As just described, in the conventional electronic commerce, the mobile terminal needs to remain connected with the commerce server all through the period from the start to end of the commerce.

Japanese Patent Application laid open No. 2000-196678 has disclosed "System and Method for Radio Data Communication Considering Disconnected Time" as a conventional technique for continuing data communication processing in a center even when data communication is cut off due to line disconnection.

In the conventional technique, data communication processing is continued in a center by acquiring beforehand a period of time in which data communication stops.

According to the technique, however, a period of time in which data communication stops has to be acquired in advance. Consequently, it is difficult to continue data communication processing in a center when line disconnection takes place unexpectedly.

As mentioned above, communication through a mobile communications network is unstable as compared to that through a wired network. Therefore, communication can be cut off abruptly at the unexpected time.

In addition, there is no significant difference between the operation sequence of the conventional electronic commerce using a mobile terminal and that of commerce using an information processing terminal connected to a wired network. In other words, the conventional technique does not make use of the characteristic of a mobile terminal that it can be connected to a mobile communications network at an arbitrary time and place.

SUMMARY OF THE INVENTION

It is therefore an object of the present invention to provide an electronic commerce system and an electronic commerce method for conducting electronic commerce making good use of characteristics of a mobile terminal.

In accordance with the first aspect of the present invention, to achieve the object mentioned above, there is provided an electronic commerce system comprising: at least one mobile terminal capable of connecting to a mobile communications network; a commerce server connected to an information and communications network; and an agent connected to the mobile communications network and the information and communications network, conducting electronic commerce for the mobile terminal so that a user of the mobile terminal purchases an article from the commerce server; wherein the mobile terminal includes an authorizing part for providing authorization for the agent to carry on electronic commerce for the mobile terminal, and an authorization information notifying part for notifying the agent of information on the authorization; the commerce server includes a procedure information notifying part for notifying the agent of information as to procedures for the electronic commerce; and the agent, at which the line of the mobile terminal may terminate, includes a first storage for storing the electronic commerce procedure information received from the commerce server, a second storage for storing the authorization information received from the mobile terminal, and an electronic commerce conducting part for, in response to a request from the mobile terminal, carrying out the procedures for the electronic commerce which the agent has the authorization to conduct according to the authorization information received from the mobile terminal based on the electronic commerce procedure information.

In accordance with the first aspect of the present invention, the agent may further include an inquiring part for, in the case where the procedures for the electronic commerce involve a procedural step which the agent does not have the authorization to execute according to the authorization information, inquiring of the mobile terminal whether or not to execute the procedural step. Besides, the mobile terminal may further include an indicating part for, in response to the inquiry as to whether or not to execute the procedural step from the agent, indicating a message to the user to inquire whether or not to execute the procedural step, and a procedural step execution information notifying part for notifying the agent of information as to whether or not to execute the procedural step based on input provided by the user in response to the message.

Further, in accordance with the first aspect of the present invention, the commerce server may further include a template information transmitting part for transmitting template information showing the electronic commerce procedure information and information necessary for having the agent carry out the procedures for the electronic commerce. The mobile terminal may further include an input requesting part for indicating the template information to the user to request the user to input information necessary for having the agent carry out the procedures for the electronic commerce. In this case, the agent is notified of the electronic commerce procedure information together with the information input by the user in response to the request, and carries out the procedures for the electronic commerce based on the information notified by the mobile terminal.

Still further, in accordance with the first aspect of the present invention, the connection via the mobile communications network between the mobile terminal and the agent may be established only while the mobile terminal is transmitting information to the agent and the agent is transmitting information to mobile terminal.

Still further, in accordance with the first aspect of the present invention, if the article of commerce is electronic data, the agent may transfer the electronic data obtained by the electronic commerce to the mobile terminal through the mobile communications network.

In accordance with the second aspect of the present invention, there is provided an electronic commerce system comprising: a group of information processing terminals including at least one mobile terminal capable of connecting to a mobile communications network; a commerce server connected to an information and communications network; and an agent connected to both the mobile communications network and the information and communications network, conducting electronic commerce for the mobile terminal so that a user of the mobile terminal purchases an article from the commerce server; wherein each of the information processing terminals includes an authorizing part for providing authorization for the agent to carry on electronic commerce for the information processing terminal, and an authorization information notifying part for notifying the agent of information on the authorization; the commerce server includes a procedure information notifying part for notifying the agent of information as to procedures for the electronic commerce; and the agent, at which the line of the mobile terminal may terminate, includes a first storage for storing the electronic commerce procedure information received from the commerce server, a second storage for storing the authorization information received from the information processing terminal, and an electronic commerce conducting part for, in response to a request from the information processing terminal, carrying out the procedures for the electronic commerce which the agent has the authorization to conduct according to the authorization information received from the information processing terminal based on the electronic commerce procedure information.

In accordance with the second aspect of the present invention, each information processing terminal may further include a user authentication information obtaining part for obtaining user authentication information to identify its user, a user authentication information notifying part for notifying the agent of the user authentication information, and an authenticating part for authenticating the agent that is to conduct the electronic commerce on behalf of the information processing terminal using a digital signature or an electronic signature contained in a digital certificate obtained from the agent. The agent may further include an identifying part for determining whether the user of the information processing terminal is the party concerned with the electronic commerce based on the user authentication information received from the information processing terminal. In this case, when transmitting information to an agent, the information processing terminal determines whether the agent is authorized to conduct the electronic commerce for the information processing terminal. If the information processing terminal has determined that the agent is authorized to conduct the electronic commerce, the agent determines whether the user of the information processing terminal is the party concerned with the electronic commerce so as to conduct the electronic commerce for the information processing terminal used by the party concerned with the electronic commerce.

Further, in accordance with the second aspect of the present invention, the agent may further include an inquiring part for, in the case where the procedures for the electronic commerce involve a procedural step which the agent does not have the authorization to execute according to the authorization information, inquiring of the information processing terminal whether or not to execute the procedural step. Besides, the information processing terminal may further include an indicating part for, in response to the inquiry as to whether or not to execute the procedural step from the agent, indicating a message to the user to inquire whether or not to execute the procedural step, and a procedural step execution information notifying part for notifying the agent of information as to whether or not to execute the procedural step based on input provided by the user in response to the message.

Still further, in accordance with the second aspect of the present invention, the commerce server may further include a template information transmitting part for transmitting template information showing the electronic commerce procedure information and information necessary for having the agent carry out the procedures for the electronic commerce. The information processing terminal may further include an input requesting part for indicating the template information to the user to request the user to input information necessary for having the agent carry out the procedures for the electronic commerce. In this case, the agent is notified of the electronic commerce procedure information together with the information input by the user in response to the request, and carries out the procedures for the electronic commerce based on the information notified by the information processing terminal.

Still further, in accordance with the second aspect of the present invention, the connection via the mobile communications network between the mobile terminal and the agent may be established only while the mobile terminal is transmitting information to the agent and the agent is transmitting information to mobile terminal.

Still further, in accordance with the second aspect of the present invention, if the article of commerce is electronic data, the agent may transfer the electronic data obtained by the electronic commerce to the information processing terminal through the mobile communications network or the information and communications network.

In accordance with the third aspect of the present invention, there is provided an electronic commerce method applied to a system comprising: at least one mobile terminal capable of connecting to a mobile communications network; a commerce server connected to an information and communications network; and an agent connected to the mobile communications network and the information and communications network, conducting electronic commerce for the mobile terminal so that a user of the mobile terminal purchases an article from the commerce server, wherein the line of the mobile terminal may terminate at the agent, the electronic commerce method comprising the steps of: providing by the mobile terminal authorization for the agent to carry on electronic commerce for the mobile terminal; notifying by the mobile terminal the agent of information on the authorization; notifying by the commerce server the agent of information as to procedures for the electronic commerce; storing by the agent the electronic commerce procedure information received from the commerce server; and storing by the agent the authorization information received from the mobile terminal; wherein, in response to a request from the mobile terminal, the agent carries out the procedures for the electronic commerce which the agent has the authorization to conduct according to the authorization information received from the mobile terminal based on the electronic commerce procedure information.

In accordance with the third aspect of the present invention, in the case where the procedures for the electronic commerce involve a procedural step which the agent does not have the authorization to execute according to the authorization information, the agent may inquire of the mobile terminal whether or not to execute the procedural step. In response to the inquiry as to whether or not to execute the procedural step from the agent, the mobile terminal may indicate a message to the user to inquire whether or not to execute the procedural step, and notify the agent of information as to whether or not to execute the procedural step based on input provided by the user in response to the message.

Further, in accordance with the third aspect of the present invention, the commerce server may transmit template information showing the electronic commerce procedure information and information necessary for having the agent carry out the procedures for the electronic commerce at the first step. Additionally, the mobile terminal may indicate the template information to the user to request the user to input information necessary for having the agent carry out the procedures for the electronic commerce. In this case, the agent is notified of the electronic commerce procedure information together with the information input by the user in response to the request, and carries out the procedures for the electronic commerce based on the information notified by the mobile terminal.

Still further, in accordance with the third aspect of the present invention, if the article of commerce is electronic data, the agent may transfer the electronic data obtained by the electronic commerce to the mobile terminal through the mobile communications network at the last step.

In accordance with the fourth aspect of the present invention, there is provided an electronic commerce method applied to a system comprising: a group of information processing terminals including at least one mobile terminal capable of connecting to a mobile communications network; a commerce server connected to an information and communications network; and an agent connected to both the mobile communications network and the information and communications network, conducting electronic commerce for the mobile terminal so that a user of the mobile terminal purchases an article from the commerce server, wherein the line of the mobile terminal may terminate at the agent, the electronic commerce method comprising the steps of: providing by the information processing terminal authorization for the agent to carry on electronic commerce for the information processing terminal; notifying by the information processing terminal the agent of information on the authorization; notifying by the commerce server the agent of information as to procedures for the electronic commerce; storing by the agent the electronic commerce procedure information received from the commerce server; and storing by the agent the authorization information received from the information processing terminal; wherein, in response to a request from the information processing terminal, the agent carries out the procedures for the electronic commerce which the agent has the authorization to conduct according to the authorization information received from the information processing terminal based on the electronic commerce procedure information, and transfers the electronic data obtained by the electronic commerce to the information processing terminal.

In accordance with the fourth aspect of the present invention, each information processing terminal may obtain user authentication information to identify its user to notify the agent of the user authentication information, and authenticate the agent that is to conduct the electronic commerce on behalf of the information processing terminal using a digital signature or an electronic signature contained in a digital certificate obtained from the agent. Besides, the agent may determine whether the user of the information processing terminal is the party concerned with the electronic commerce based on the user authentication information received from the information processing terminal. In this case, when transmitting information to an agent, the information processing terminal determines whether the agent is authorized to conduct the electronic commerce for the information processing terminal. If the information processing terminal has determined that the agent is authorized to conduct the electronic commerce, the agent determines whether the user of the information processing terminal is the party concerned with the electronic commerce so as to conduct the electronic commerce for the information processing terminal used by the party concerned with the electronic commerce.

Further, in accordance with the fourth aspect of the present invention, in the case where the procedures for the electronic commerce involve a procedural step which the agent does not have the authorization to execute according to the authorization information, the agent may inquire of the information processing terminal whether or not to execute the procedural step. In response to the inquiry as to whether or not to execute the procedural step from the agent, the information processing terminal may indicate a message to the user to inquire whether or not to execute the procedural step, and notify the agent of information as to whether or not to execute the procedural step based on input provided by the user in response to the message.

Still further, in accordance with the fourth aspect of the present invention, the commerce server may transmit template information showing the electronic commerce procedure information and information necessary for having the agent carry out the procedures for the electronic commerce at the first step. Additionally, the information processing terminal may indicate the template information to the user to request the user to input information necessary for having the agent carry out the procedures for the electronic commerce. In this case, the agent is notified of the electronic commerce procedure information together with the information input by the user in response to the request, and carries out the procedures for the electronic commerce based on the information notified by the information processing terminal.

Still further, in accordance with the fourth aspect of the present invention, if the article of commerce is electronic data, the agent may transfer the electronic data obtained by the electronic commerce to the information processing terminal at the last step.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing the construction of a conventional electronic commerce system;

FIG. 2 is a sequence diagram showing the operation of the conventional electronic commerce system depicted in FIG. 1;

DESCRIPTION OF THE PREFERRED EMBODIMENTS

Figure 3:
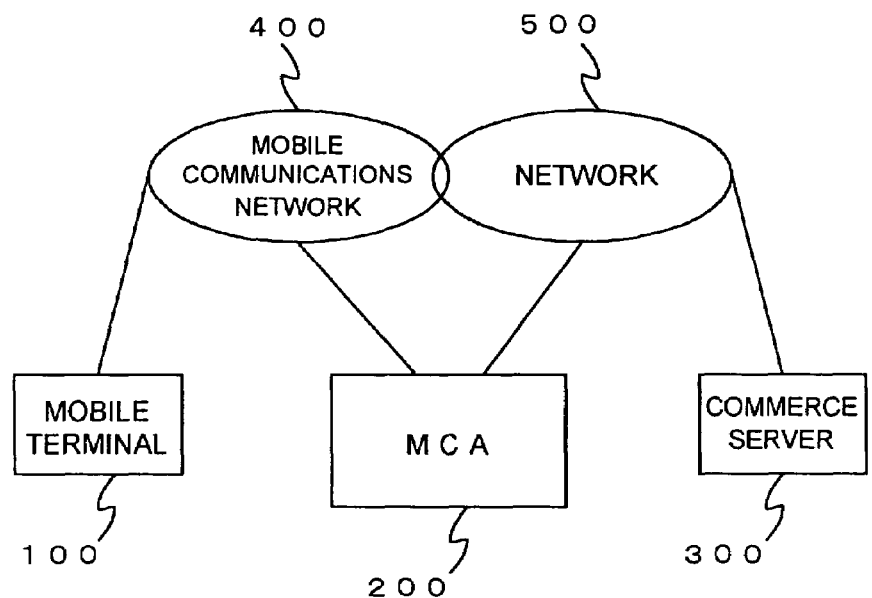
FIG. 3 is a block diagram showing the construction of an electronic commerce system according to the first embodiment of the present invention.

Referring now to the drawings, a description of preferred embodiments of the present invention will be given in detail.

In the following the first embodiment of the present invention will be described. FIG. 3 is a block diagram showing the construction of an electronic commerce system according to the first embodiment of the present invention. Referring to FIG. 3, the electronic commerce system comprises a mobile terminal 100, a mobile commerce agent 200, a commerce server 300, a mobile communications network 400 and a network 500. The mobile terminal 100, mobile commerce agent 200, and commerce server 300 are connected via the mobile communications network 400 and network 500.

Figure 4:
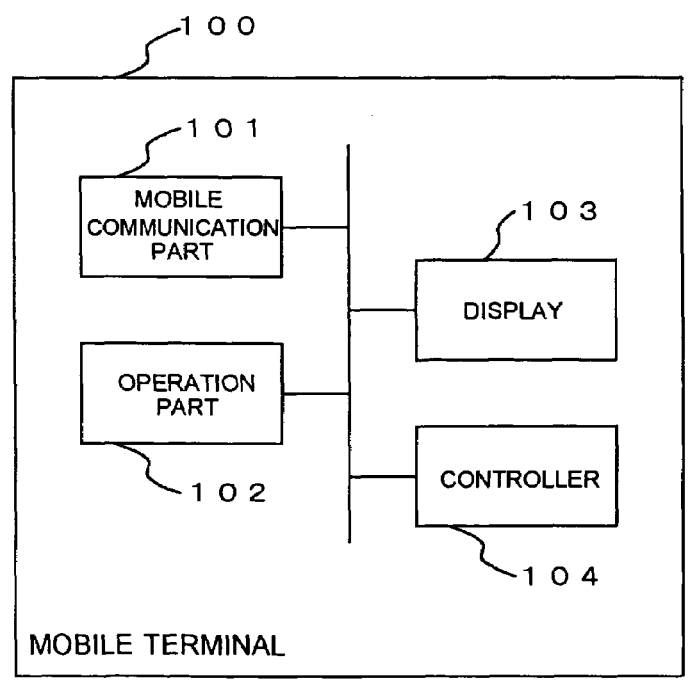
FIG. 4 is a block diagram showing the construction of a mobile terminal used in the electronic commerce system depicted in FIG. 3.

FIG. 4 is a block diagram showing the construction of the mobile terminal 100. The mobile terminal 100 is provided with a mobile communication part 101, an operation part 102, a display 103 and a controller 104. The mobile communication part 101 is a functional unit for transmitting and receiving information through the mobile communications network 400. The mobile communication part 101 includes a radio circuit for encoding a signal to be transmitted and decoding a signal received, and an antenna for transmitting and receiving radio signals. The operation part 102 is a user interface with which a user carries out input operations. The operation part 102 may include a voice recognition input device as well as a keyboard and a pointing device. The display 103 shows the user information. Apart from a device which indicates information visually such as a liquid crystal display (LCD), a speaker may be employed to provide information to the user. The controller 104 is a control unit for controlling the operation of each component in the mobile terminal 100.

Figure 5:
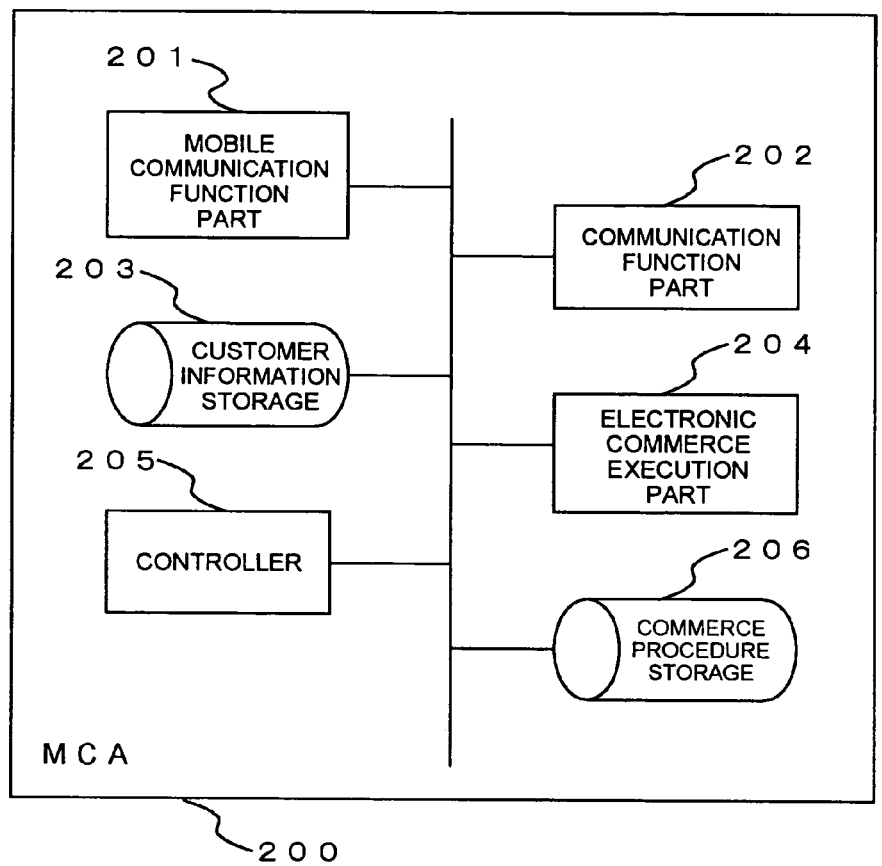
FIG. 5 is a block diagram showing the construction of a mobile commerce agent used in the electronic commerce system depicted in FIG. 3.

FIG. 5 is a block diagram showing the construction of the mobile commerce agent (MCA) 200. The MCA 200 is provided with a mobile communication function part 201, a communication function part 202, a customer information storage 203, electronic commerce execution part 204, a controller 205, and a commerce procedure storage 206.

The mobile communication function part 201 is a functional unit for transmitting and receiving information through the mobile communications network 400. For example, the mobile communication function part 201 encodes a signal to be transmitted through the mobile communications network 400 and decodes a signal received via the network 400. The communication function part 202 is a functional unit for transmitting and receiving information through the network 500. The communication function part 202, for example, encodes a signal to be transmitted through the network 500 and decodes a signal received via the network 500. The customer information storage 203 stores information about a customer (user of the mobile terminal 100) obtained from the mobile terminal 100. The electronic commerce execution part 204 carries on electronic commerce with the commerce server 300. The controller 205 controls the operation of each component in the MCA 200 so that the MCA 200 acts as an intermediary in electronic commerce between the mobile terminal 100 and commerce server 300. The commerce procedure storage 206 stores information as to procedures for electronic commerce mediated by the MCA 200.

Figure 6:
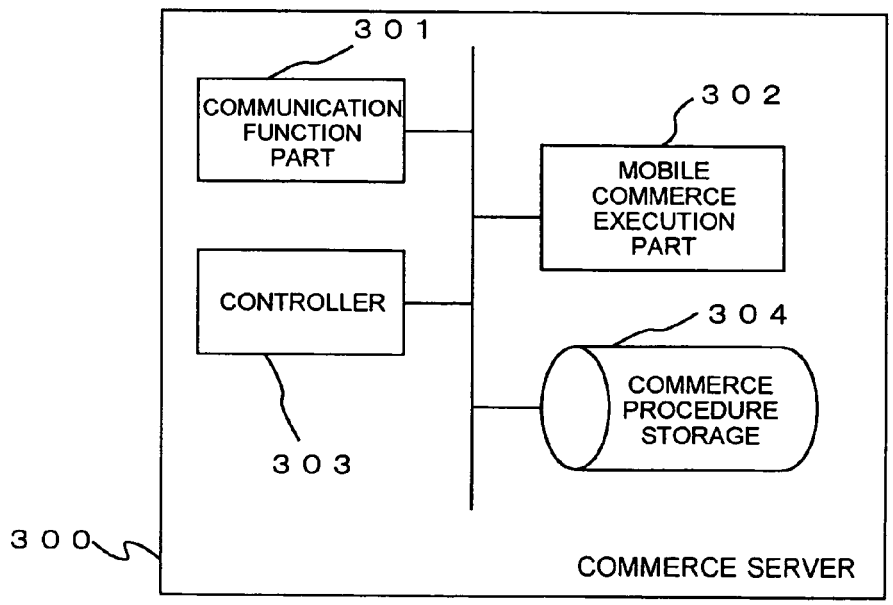
FIG. 6 is a block diagram showing the construction of a commerce server used in the electronic commerce system depicted in FIG. 3.

FIG. 6 is a block diagram showing the construction of the commerce server 300. The commerce server 300 is provided with a communication function part 301, a mobile commerce execution part 302, a controller 303, and a commerce procedure storage 304. The communication function part 301 is a functional unit for transmitting and receiving information through the network 500. The mobile commerce execution part 302 carries on electronic commerce with the mobile terminal 100. The controller 303 controls the operation of each component in the commerce server 300. The commerce procedure storage 304 stores information as to procedures for electronic commerce between the mobile terminal 100 and commerce server 300.

Figure 7:
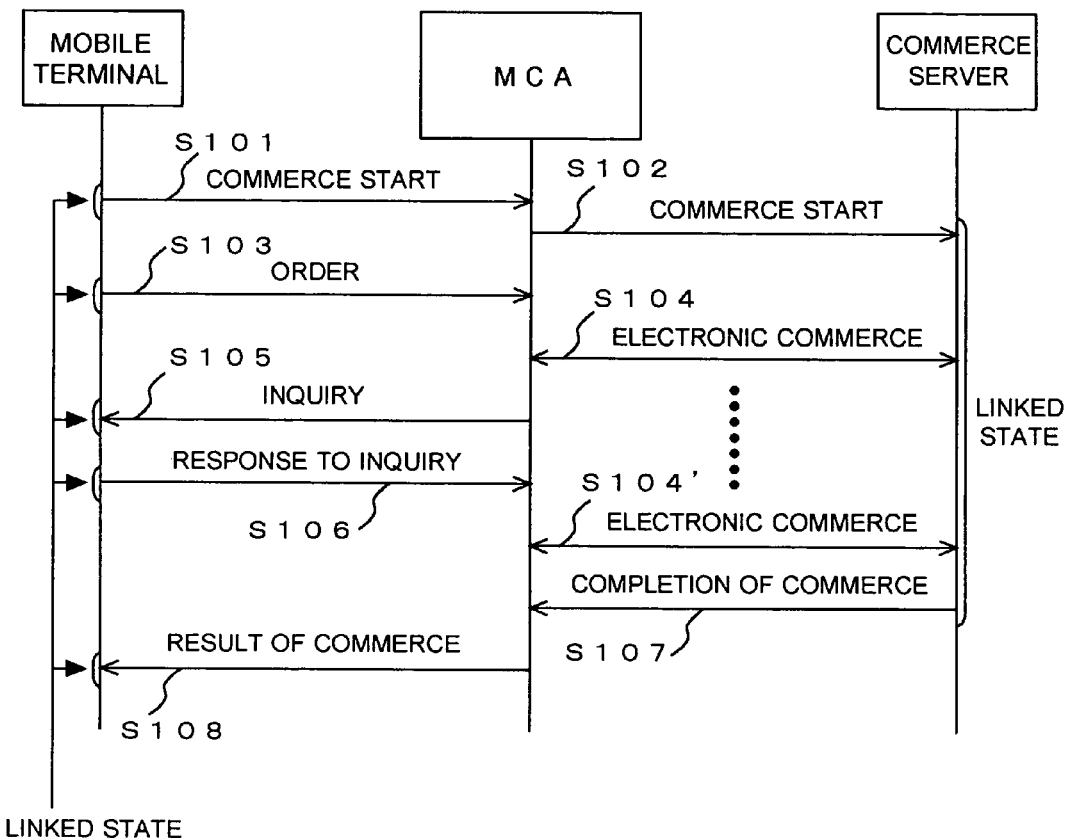
FIG. 7 is a sequence diagram showing the operation of the electronic commerce system depicted in FIG. 3.

FIG. 7 is a sequence diagram showing the operation of the electronic commerce system according to this embodiment. In FIG. 7, user information or information about the user of the mobile terminal 100 has already been stored in the customer information storage 203 of the MCA 200. Incidentally, examples of the user information include authorization information indicating authorization and commissions which the MCA 200 has received from the user of the mobile terminal 100 to conduct electronic commerce (e.g. whether or not the MCA 200 should make settlement, maximum settlement amount and the like), and customer information necessary for electronic commerce such as a user name and a credit card number. Besides, in the commerce procedure storage 206 has been stored information as to procedures for electronic commerce mediated by the MCA 200.

First, in the mobile terminal 100 of a customer, the mobile communication part 101 accesses the MCA 200 via the mobile communications network 400 under the control of the controller 104 to inform the MCA 200 of the initiation of electronic commerce (step S 101). In the MCA 200, when the mobile communication function part 201 receives information on the initiation of electronic commerce sent from the mobile terminal 100 via the mobile communications network 400, the communication function part 202 accesses the commerce server 300 via the network 500 under the control of the controller 205 to inform the server 300 of the initiation of electronic commerce (step S 102).

At the start of practical electronic commerce, the controller 101 of the mobile terminal 100 sends the MCA 200 an order with the commerce server 300, which is registered with the MCA 200, for an article or goods according to input provided by the user through the operation part 102 (step S 103).

In the MCA 200, when the mobile communication function part 201 receives the order sent from the mobile terminal 100 via the mobile communications network 400, the electronic commerce execution part 204 conducts electronic commerce with the commerce server 300 under the control of the controller 205 according to information as to procedures for electronic commerce stored in the commerce procedure storage 206 making use of the user information previously stored in the customer information storage 203 (step S104).

Thereafter, the electronic commerce execution part 204 of the MCA 200 and the mobile commerce execution part 302 of the commerce server 300 perform the procedures indicated by the information stored in the commerce procedure storages 206 and 304 so as to carry on the electronic commerce (step S104').

In the case where the controller 205 of the MCA 200 needs to send an inquiry to the customer (e.g. when there are a number of options or no options) during the electronic commerce with the commerce server 300, the mobile communication function part 201 sends the inquiry to the mobile terminal 100 via the mobile communications network 400 under the control of the controller 205. Incidentally, when the customer has determined that confirmation is required to continue electronic commerce as authorization information, the controller 205 of the MCA 200 send an inquiry to the mobile terminal 100 even if there is only one option (step S105).

When the mobile terminal 100 receives the inquiry, for example, the display 103 indicates the inquiry on its screen under the control of the controller 104 to request the user to input necessary information. After the user inputs information using the operation part 102 in response to the request, the controller 104 of the mobile terminal 100 transmits the information to the MCA 200 via the mobile communications network 400 (step S106).

When the MCA 200 receives the information from the mobile terminal 100, the electronic commerce execution part 204 continues the electronic commerce with the commerce server under the control of the controller 205 based on the information.

On completion of the electronic commerce with the MCA 200, the controller 303 of the commerce server 300 instructs the mobile commerce execution part 302 to inform the MCA 200 about the completion of the commerce (step S107).

Having received the information as to the completion of the electronic commerce from the commerce server 300, the controller 205 of the MCA 200 informs the mobile terminal 100 that the commerce has been completed (step S108). Incidentally, if the article of commerce is electronic data, the MCA 200 sends the electronic data obtained from the commerce server 300 to the mobile terminal 100 together with the information as to the completion of the electronic commerce. On the other hand, if the article of commerce is corporeal one, the article is delivered to the customer as for example by parcel delivery service.

In the aforementioned operation sequence, the mobile terminal 100 has to be connected with the MCA 200 via the mobile communications network 400 only when the terminal 100 transmits information to the MCA 200 at steps S101, S103 and S106, and when the terminal 100 receives information from the MCA 200 at steps S105 and S108. It is, therefore, possible to disconnect the mobile terminal 100 from the line temporarily after communication with the MCA 200 is completed at each step.

That is, after the user of the mobile terminal 100 orders an article at step S103, he/she can move to another place via a route where the mobile communications network 400 is not accessible, such as a subterranean passage. Then, the user can receive the article at the place where he/she has gone (step S108).

More specifically, for example, after the user orders a ticket for a film or movie using a mobile terminal, he/she can go to a cinema or movie theater by underground or subway. Then, the user can receive the ticket he/she ordered at the box office of the cinema or movie theater.

In addition, the mobile terminal 100 needs to be capable of connecting with the mobile communications network 400 only at the steps above mentioned to accomplish electronic commerce. Besides, communication at each of the steps requires a short period of time. Consequently, the possibility that connection between the mobile terminal 100 and the mobile communications network 400 is cut off abruptly is reduced. Thus, electronic commerce can be conducted stably through the use of the mobile terminal 100.

As is described above, in the electronic commerce system according to the first embodiment of the present invention, it is possible to conduct electronic commerce stably by use of a mobile terminal.

In the following the second embodiment of the present invention will be described. An electronic commerce system of the second embodiment has the same construction as described previously for that of the first embodiment. That is, the mobile terminal 100, mobile commerce agent 200, and commerce server 300 are connected via the mobile communications network 400 and network 500.

Figure 8:
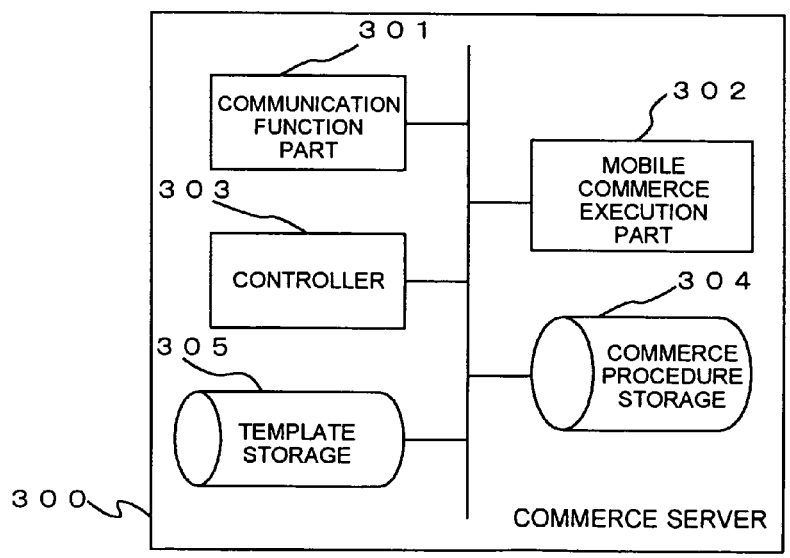
FIG. 8 is a block diagram showing the construction of a commerce server used in an electronic commerce system according to the second embodiment of the present invention.

FIG. 8 is a block diagram showing the construction of the commerce server 300 of the second embodiment. The commerce server 300 of this embodiment is of essentially the same construction as that of the first embodiment except for the presence of a template storage 305. The template storage 305 stores a template (commission template) with which the user of the mobile terminal 100 commissions the MCA 200 to conduct electronic commerce.

The commission template corresponds to information as to procedures for electronic commerce and authorization and commissions which the MCA 200 has received from the user of the mobile terminal 100 to conduct electronic commerce. The user can determine or select and input items of authorization information. To be more precise, in the commission template, there may be blanks in which the user puts necessary information such as the number of a credit card used to make settlement, or the user may be allowed some options for the maximum amount of payment that the MCA 200 can make in electronic commerce. Incidentally, the commission template in which the user fills in the blanks or takes and inputs his/her choice will hereinafter be referred to as a completed commission template. The completed commission template shows user information necessary for electronic commerce and the procedures of the commerce.

While a credit card is used in settlement of electronic commerce in the above description, payment by credit card is cited merely by way of example and without limitation. For instance, it is possible to make a payment by digital or electronic money.

Figure 9:
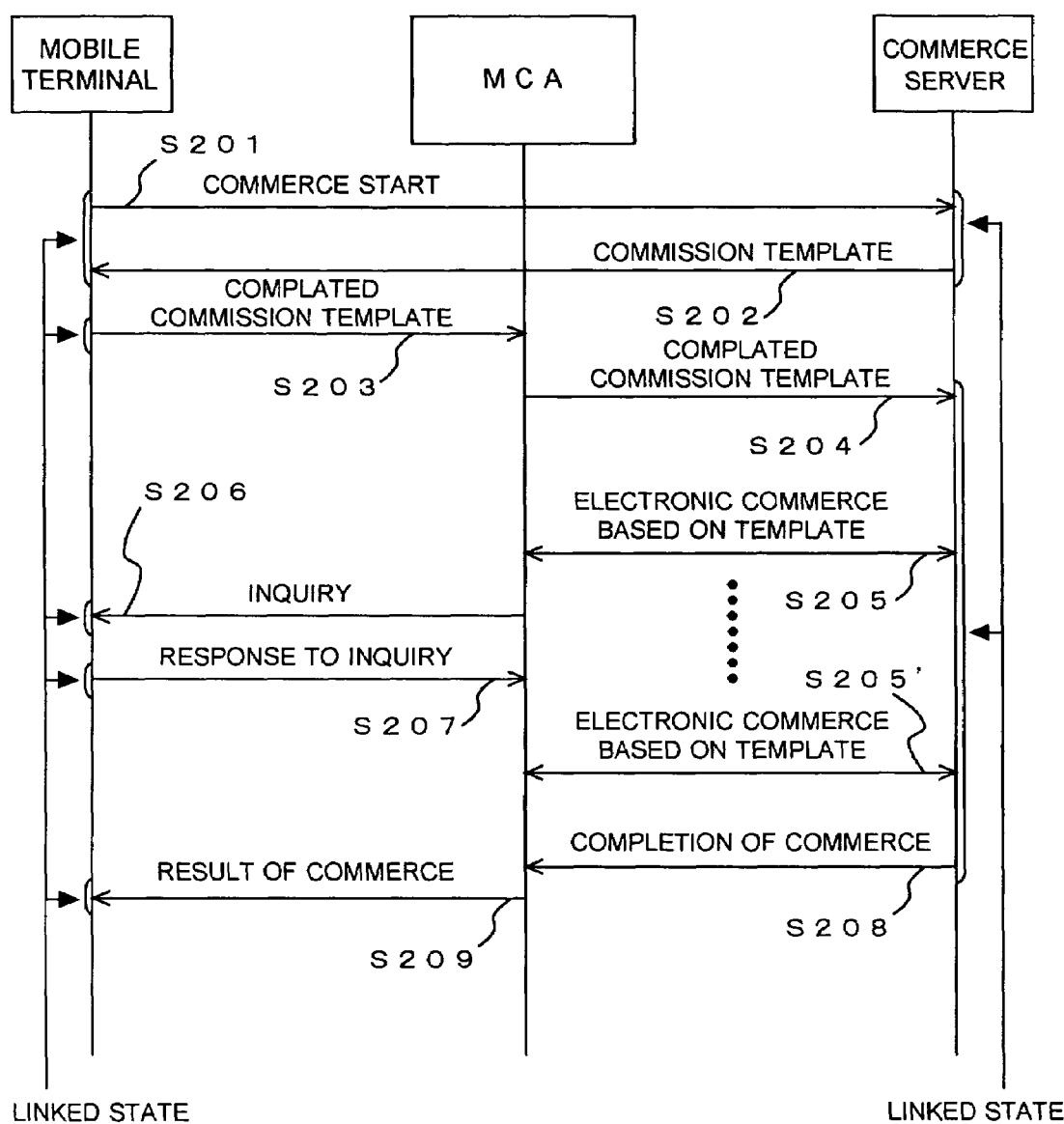
FIG. 9 is a sequence diagram showing the operation of the electronic commerce system according to the second embodiment of the present invention.

FIG. 9 is a sequence diagram showing the operation of the electronic commerce system according to the second embodiment of the present invention. In this embodiment, the mobile terminal 100, the MCA 200 and the commerce server 300 share no common information. In other words, authorization information and customer information have not been stored in the customer information storage 203 of the MCA 200, and information about procedures for electronic commerce with the commerce server 300 has not been stored in the commerce procedure storage 206.

First, a customer carries out input operations to start electronic commerce with the operation part 102, and the controller 104 of the mobile terminal 100 informs the commerce server 300 of the initiation of electronic commerce via the mobile communications network 400 and network 500 (step S 201).

When the commerce server 300 receives the information as to the initiation of electronic commerce from the mobile terminal 100, the controller 303 of the commerce server 300 reads a template (commission template) with which the customer commissions the MCA 200 to conduct electronic commerce out of the template storage 305, and transmits the template to the terminal 100 via the mobile communications network 400 and network 500 (step S202). Incidentally, data or information such as commissions, details of procedures for electronic commerce, terms and conditions, customer information (e.g. credit card number), digital or electronic signature of the customer can be written to the commission template.

When the mobile terminal 100 receives the commission template sent from the commerce server 300, the display 103 indicates the template on its screen under the control of the controller 104 to request the user to input necessary information. After the user inputs information to the commission template, the controller 104 of the mobile terminal 100 transmits the template (completed commission template) to the MCA 200 via the mobile communications network 400 (step S203).

On receipt of the completed commission template sent from the mobile terminal 100 via the mobile communications network 400, the controller 205 of the MCA 200 stores information concerning the customer, such as authorization information and customer information, which have been input to the template in the customer information storage 203 together with the commission template. Meanwhile, the controller 205 stores information regarding the details of electronic commerce in the commerce procedure storage 206. Then, the controller 205 of the MCA 200 transmits the completed commission template to the commerce server 300 via the network 500 (step S204).

Subsequently, in the MCA 200, the electronic commerce execution part 204 conducts electronic commerce with the commerce server 300 under the control of the controller 205 according to the information stored in the commerce procedure storage 206 (step S205).

Thereafter, the electronic commerce execution part 204 of the MCA 200 and the mobile commerce execution part 302 of the commerce server 300 perform the procedures indicated by the information stored in the commerce procedure storages 206 and 304 so as to carry on the electronic commerce (step S205').

The commerce server 300 carries on the electronic commerce with the MCA 200 while checking whether the commerce complies with the information from the completed commission template fed by the MCA 200 to confirm the correctness of the commerce.

In the case where the controller 205 of the MCA 200 is obligated to send an inquiry to the customer according to template information or needs to send an inquiry to the customer (e.g. when there are a number of options or no options) during the electronic commerce with the commerce server 300, the mobile communication function part 201 sends the inquiry to the mobile terminal 100 via the mobile communications network 400 under the control of the controller 205. Incidentally, when the customer has determined that confirmation is required to continue electronic commerce as authorization information, the controller 205 of the MCA 200 send an inquiry to the mobile terminal 100 even if there is only one option (step S206).

When the mobile terminal 100 receives the inquiry, for example, the display 103 indicates the inquiry on its screen under the control of the controller 104 to request the user to input necessary information. After the user inputs information in response to the request, the controller 104 of the mobile terminal 100 transmits the information to the MCA 200 via the mobile communications network 400 (step S207).

When the MCA 200 receives the information from the mobile terminal 100, the electronic commerce execution part 204 continues the electronic commerce with the commerce server 300 under the control of the controller 205 based on the information.

On completion of the electronic commerce with the MCA 200 based on the information from the completed commission template, the controller 303 of the commerce server 300 informs the MCA 200 about the completion of the commerce (step S208).

Having received the information as to the completion of the electronic commerce from the commerce server 300, the controller 205 of the MCA 200 informs the mobile terminal 100 that the commerce has been completed (step S209). Incidentally, if the article of commerce is electronic data, the MCA 200 sends the electronic data obtained from the commerce server 300 to the mobile terminal 100 together with the information as to the completion of the electronic commerce. On the other hand, if the article of commerce is corporeal one, the article is delivered to the customer, for example, by parcel delivery service.

In the aforementioned operation sequence, the mobile terminal 100 has to be connected with the MCA 200 via the mobile communications network 400 only when the terminal 100 transmits information to the MCA 200 at steps S201 and S203, receives an inquiry from the MCA 200 at step S206, sends a response to the MCA 200 at step S207, and receives information from the MCA 200 at step S209. It is, therefore, possible to disconnect the mobile terminal 100 from the line temporarily after communication with the MCA 200 is completed at each step.

That is, after the user of the mobile terminal 100 commissions the MCA 200 to conduct electronic commerce at step S 203, he/she can move to another place via a route where the mobile communications network 400 is not accessible, such as a subterranean passage. Then, the user can receive the article at the place where he/she has gone (step S209).

In addition, the mobile terminal 100 needs to be capable of connecting with the mobile communications network 400 only at the steps above mentioned to accomplish electronic commerce. Besides, communication at each of the steps require a short period of time. Consequently, the possibility that connection between the mobile terminal 100 and the mobile communications network 400 is cut off abruptly is reduced. Thus, electronic commerce can be conducted stably with the mobile terminal 100.

Figure 10:
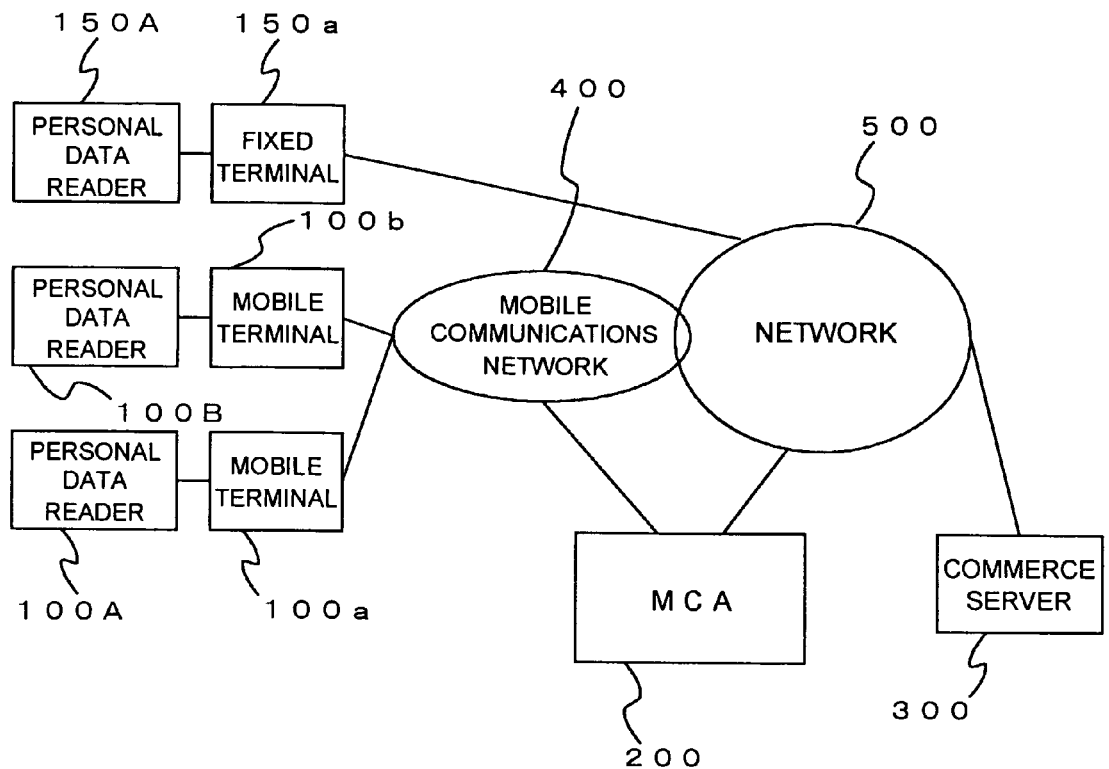
FIG. 10 is a block diagram showing the construction of an electronic commerce system according to the third embodiment of the present invention.

In the following, the third embodiment of the present invention will be described. FIG. 10 is a block diagram showing the construction of an electronic commerce system according to the third embodiment of the present invention. Referring to FIG. 10, the electronic commerce system of the third embodiment includes mobile terminals 100a and 100b, and a fixed terminal 150a used by a customer differently from that of the first embodiment. These terminals are connected with the mobile commerce agent 200 and commerce server 300 through the mobile communications network 400 and network 500.

The mobile terminals 100a and 100b, and the fixed terminal 150a are connected with personal data readers 100A, 100B and 150A, respectively. The personal data reader may be a device in which information that identifies or authenticates an operator or a user of the terminal, including personal identifier, user ID, and password, is input. Besides, the personal data reader may be a device that reads personal biometric data such as fingerprint, iris and contour to identify a user, or a device such as an IC card reader for reading information that identifies or authenticates a user stored on a recording medium such as an IC card.

While fingerprint, iris and contour are cited as examples of biometric data, they are given merely by way of example and without limitation. Information other than them, for example, voice pattern or voiceprint, may be utilized as biometric data. Also the examples of biometric data given above may be utilized in combination.

Figure 11:
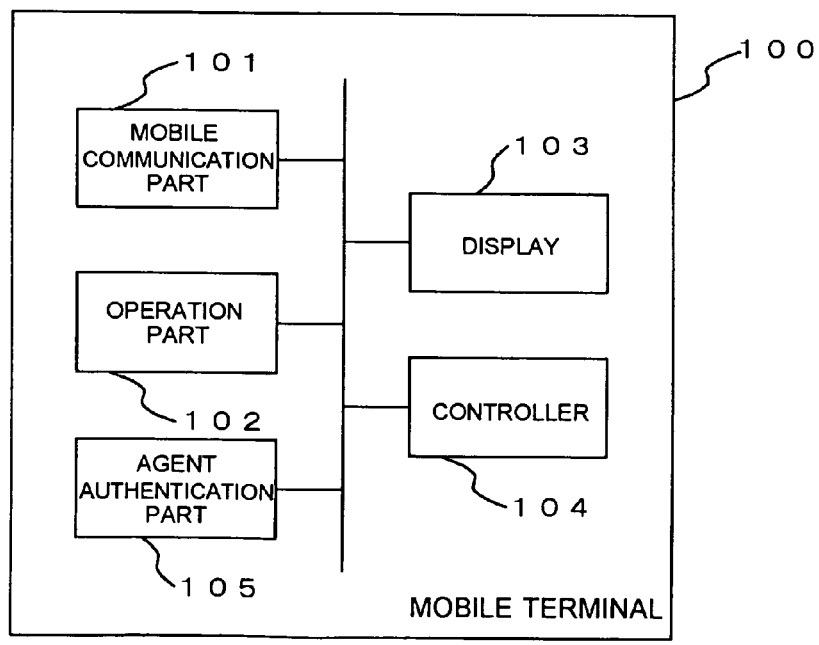
FIG. 11 is a block diagram showing the construction of a mobile terminal used in the electronic commerce system depicted in FIG. 10.

FIG. 11 is a block diagram showing the construction of the mobile terminal 100 (100a, 100b). The mobile terminal 100 of this embodiment has essentially the same construction as that of the first embodiment except for the presence of an agent authentication part 105. Based on a digital or electronic signature contained in a digital certificate, the agent authentication part 105 identifies or authenticates the MCA 200 that a user of the mobile terminal 100 commissions to conduct electronic commerce.

The fixed terminal 150a is of essentially the same construction as the mobile terminal 100 except that it has a communication part for transmitting and receiving information through the network 500 as a substitute for the mobile communication part 101. Therefore, the construction of the fixed terminal 150a is not shown in the drawing, and will not be fully described herein.

Figure 12:
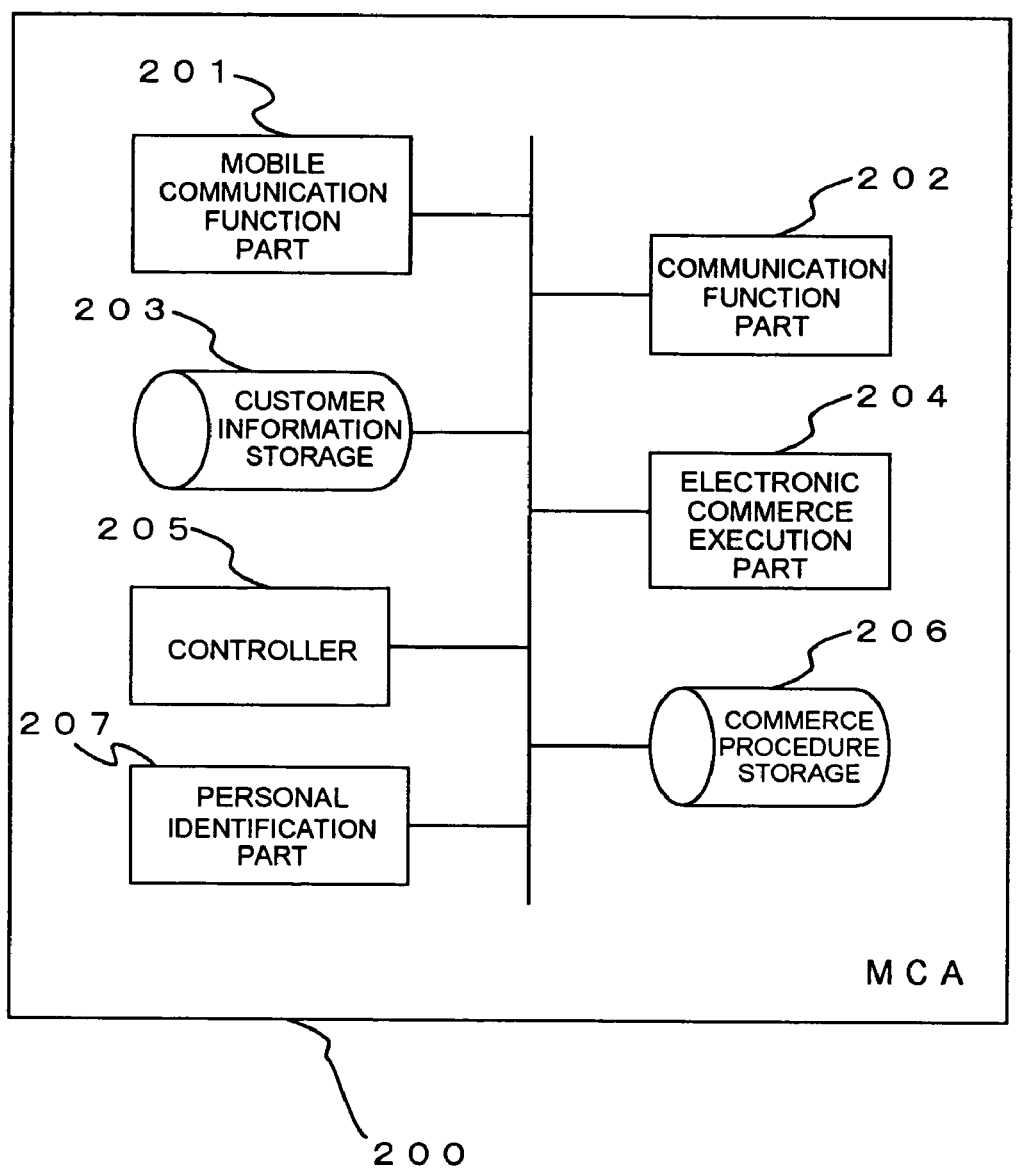
FIG. 12 is a block diagram showing the construction of a mobile commerce agent used in the electronic commerce system depicted in FIG. 10.

FIG. 12 is a block diagram showing the construction of the MCA 200 of the third embodiment. The MCA 200 of this embodiment has essentially the same construction as that of the first embodiment except for the presence of a personal identification part 207. The personal identification part 207 is a functional unit for identifying the user of the mobile terminals 100a and 100b as well as the fixed terminal 150a. According to personal identification information obtained from a terminal (mobile terminals 100a and 100b, fixed terminal 150a) that a customer is operating, the personal identification part 207 determines whether or not the terminal which the MCA 200 communicates with is the terminal of a party who is interested in electronic commerce.

Figure 13:
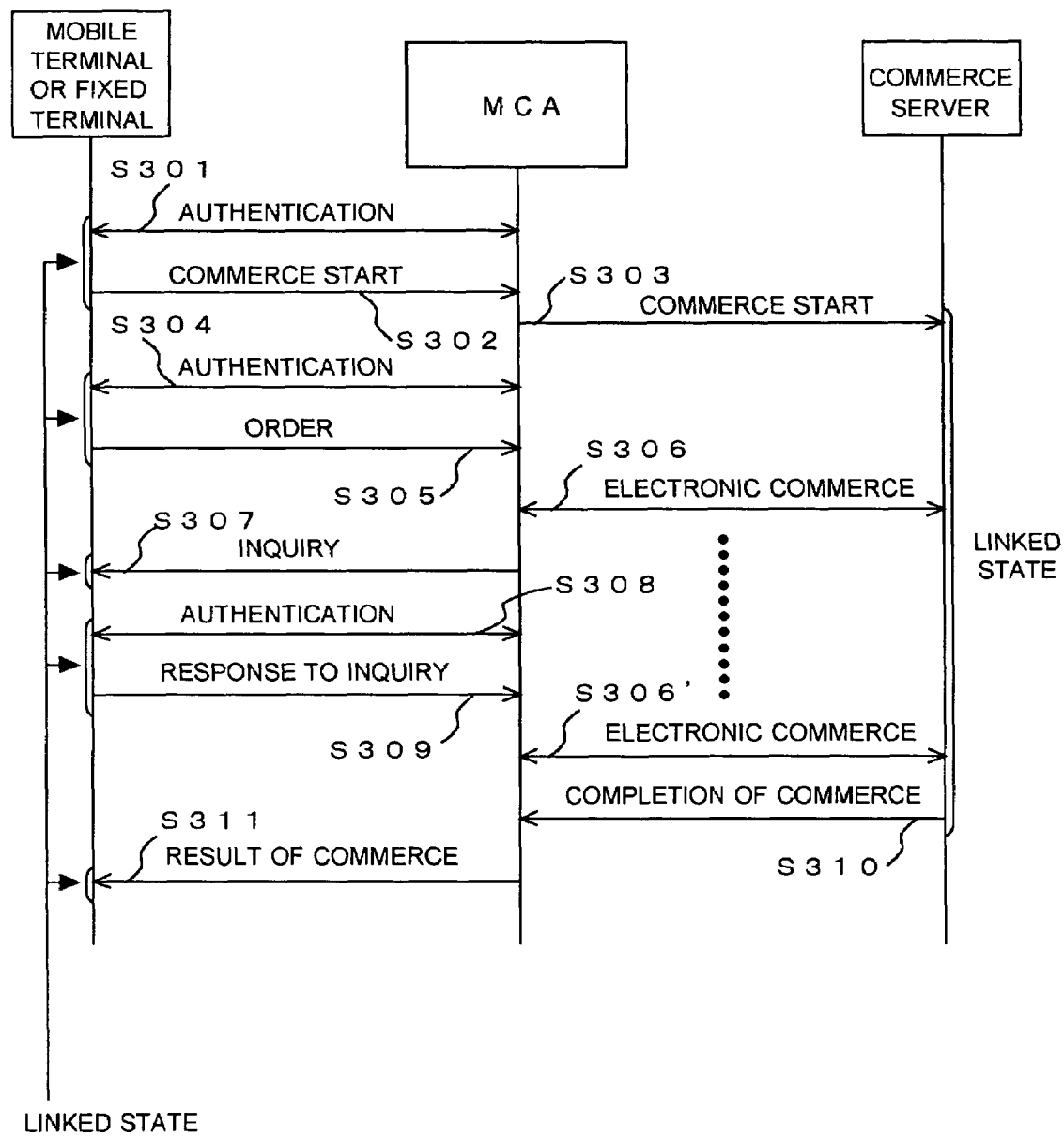
FIG. 13 is a sequence diagram showing the operation of the electronic commerce system depicted in FIG. 10.

FIG. 13 is a sequence diagram showing the operation of the electronic commerce system of the third embodiment.

The operation of the electronic commerce system shown in FIG. 13 is in many respects basically similar to that of FIG. 7. However, on the occasion when a terminal that a customer is operating transmits information to the MCA 200, the terminal and the MCA 200 authenticate one another (two-way authentication) differently from the electronic commerce system of the first embodiment.

More specifically, before the terminal of the customer informs the MCA 200 of the initiation of electronic commerce (step S 302), before the terminal sends the MCA 200 information respecting an order for an article or goods (step S305), and before the terminal sends the MCA 200 a response to an inquiry from the MCA 200 (step S309), the terminal and the MCA 200 authenticate each other (steps S301, S304 and S308).

Incidentally, on the occasion of the two-way authentication, the controller 205 of the MCA 200 transmits a digital certificate that contains a digital or electronic signature to the terminal that the customer is operating (any one of the mobile terminals 100a and 100b, and fixed terminal 150a). As an example, it will be assumed that the MCA 200 sends the digital certificate to the mobile terminals 100a. When the mobile terminals 100a receives the digital certificate, the agent authentication part 105 authenticates the digital or electronic signature. Thus, the mobile terminals 100a authenticates the MCA 200. Besides, the controller 104 of the mobile terminals 100a transmits information about the customer or personal identification information obtained by the personal data reader 100A to the MCA 200. Based on the personal identification information fed by the mobile terminals 100a, the personal identification part 207 of the MCA 200 identifies and authenticates the customer or the user of the mobile terminals 100a. The same applies to the case where the customer is operating the mobile terminals 100b or the fixed terminal 150a.

Since the terminal of the customer and the MCA 200 authenticate one another before each communication, the customer can change the terminal to use during electronic commerce. Thereby, the customer can order an article with the mobile terminal at the place where he/she has gone, and receive the article using the fixed terminal after he/she returns home.

In addition, because the terminal of the customer authenticates the MCA 200 previous to sending information thereto, it is possible to prevent unauthorized or third parties from obtaining customer information, such as a credit card number, illegally. As a result, the customer can commission the MCA 200 to conduct electronic commerce without worrying about leakage of his/her personal data or information.

In this embodiment, the terminal that the customer operates (mobile terminals 100a and 100b, and fixed terminal 150a) has a functional unit (agent authentication part 105) for authenticating the MCA 200. On the other hand, the MCA 200 has a functional unit (personal identification part 207) to authenticate the customer or client for electronic commerce. However, it is not necessary to provide these functional units to the terminal and the MCA 200.

Figure 14:
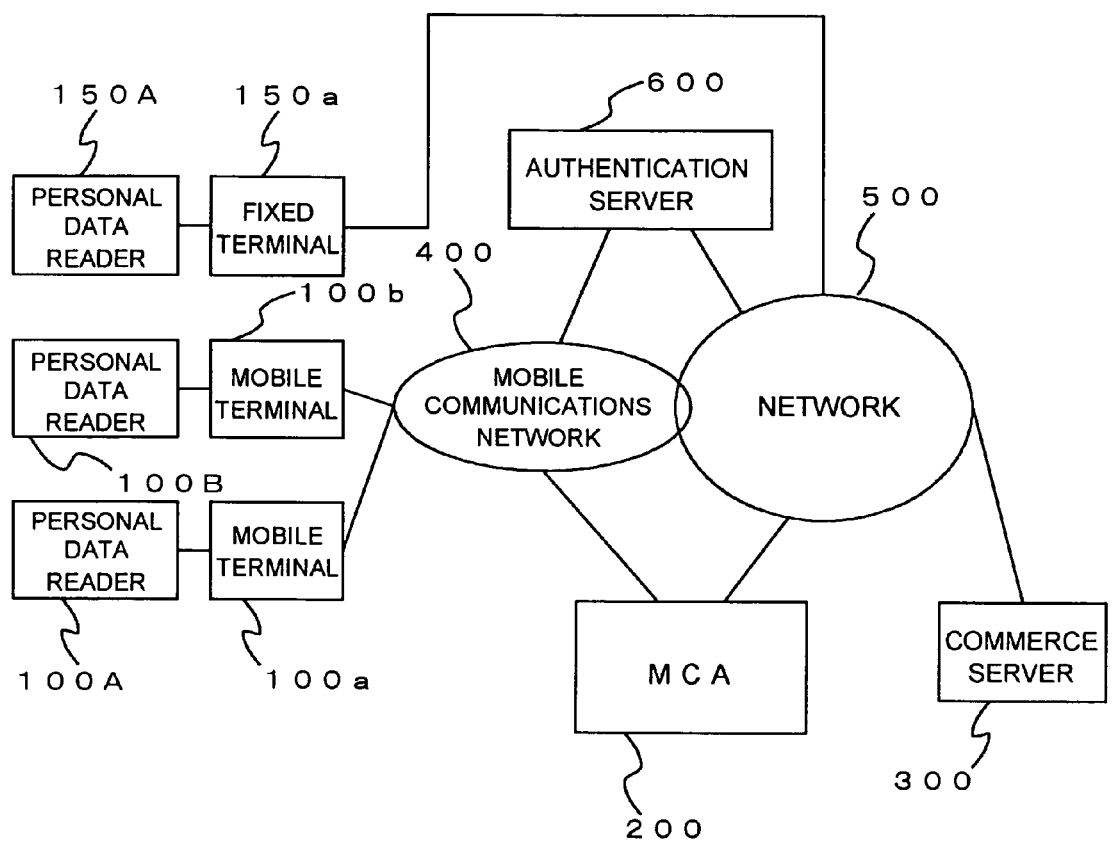
FIG. 14 is a block diagram showing the modified construction of the electronic commerce system according to the third embodiment of the present invention.
Figure 15:
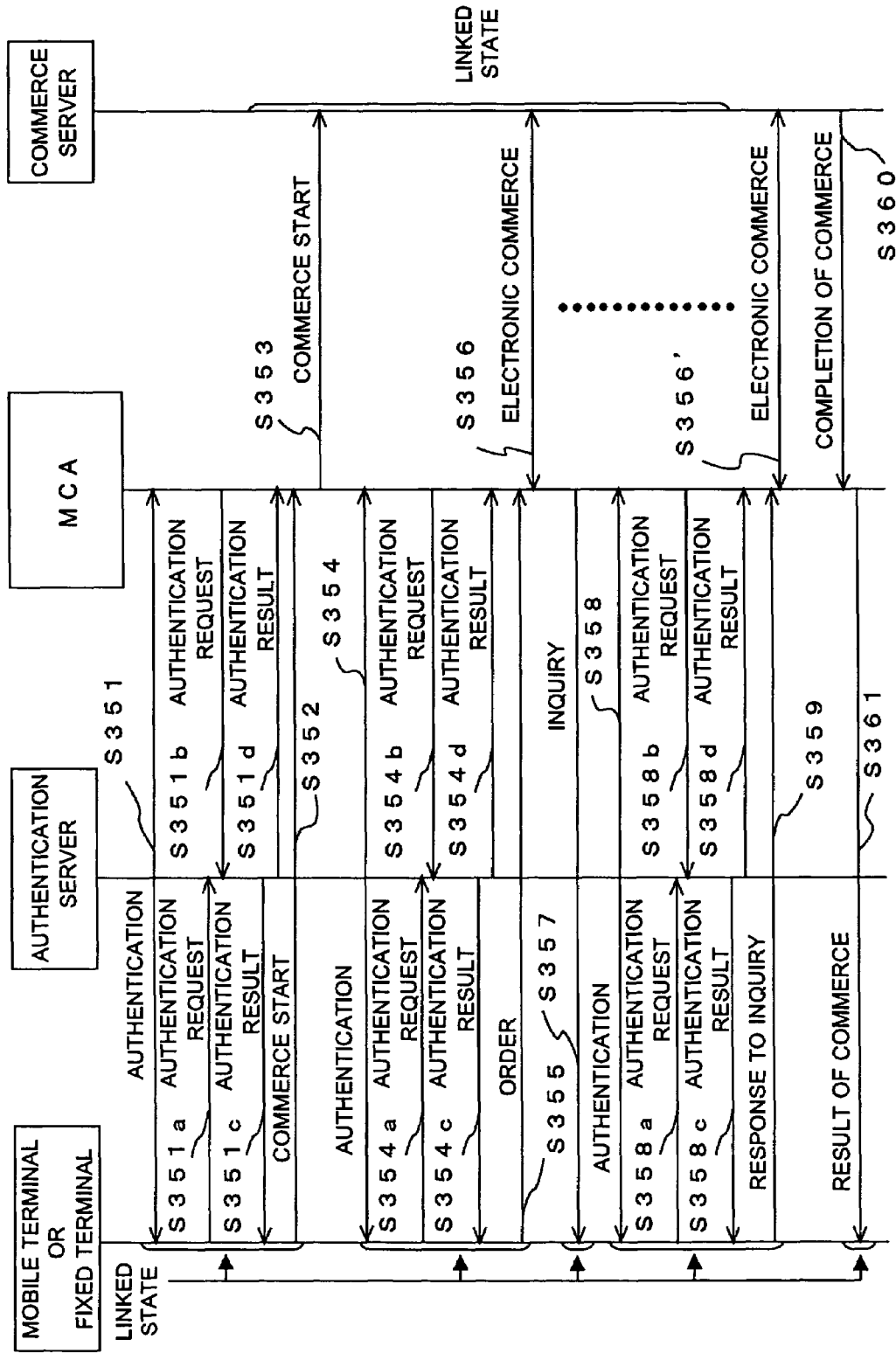
FIG. 15 is a sequence diagram showing the operation of the electronic commerce system depicted in FIG. 14.

FIG. 14 is a block diagram showing the modified construction of the electronic commerce system according to the third embodiment of the present invention. FIG. 15 is a sequence diagram showing the operation of the electronic commerce system shown in FIG. 14. As can be seen in FIG. 14, the electronic commerce system further comprises an authentication server 600. In this electronic commerce system, on the occasion of the two-way authentication (steps S351, S354 and S358 in FIG. 15), the controller 104 of the terminal that the customer is operating and the controller 205 of the MCA

200 may request the authentication server 600 to carry out authentication operation (steps S351*a*, S351*b*, S354*a*, S354*b*, S358*a* and S358*b* in FIG. 15), thereby obtaining the result of the authentication operation from the server 600 (steps S351*c*, S351*d*, S354*c*, S354*d*, S358*c* and S358*d* in FIG. 15). While, in the aforementioned operation sequence, both of the terminal that the customer is operating and the MCA 200 request the authentication server 600 to perform authentication operation, either one of them may make the request to the server 600.

In the following, the fourth embodiment of the present invention will be described. An electronic commerce system of the fourth embodiment has the same construction as described previously for that of the third embodiment. That is, the electronic commerce system includes the mobile terminals 100*a* and 100*b*, and fixed terminal 150*a*, which are connected to the MCA 200 and commerce server 300 via the mobile communications network 400 and network 500.

Figure 16:
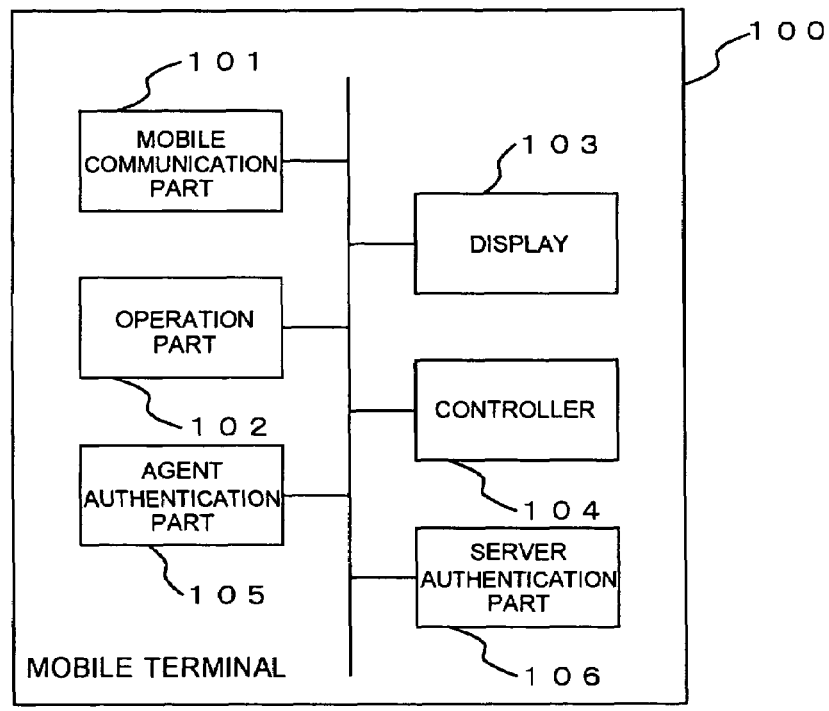
FIG. 16 is a block diagram showing the construction of a mobile terminal used in an electronic commerce system according to the fourth embodiment of the present invention.

FIG. 16 is a block diagram showing the construction of the mobile terminal 100 of the fourth embodiment. The mobile terminal 100 of this embodiment is of essentially the same construction as that of the third embodiment except for the presence of a server authentication part 106. The server authentication part 106 identifies or authenticates the commerce server 300, with which the mobile terminal 100 conducts electronic commerce, based on a digital or electronic signature contained in a digital certificate or the like.

Figure 17:
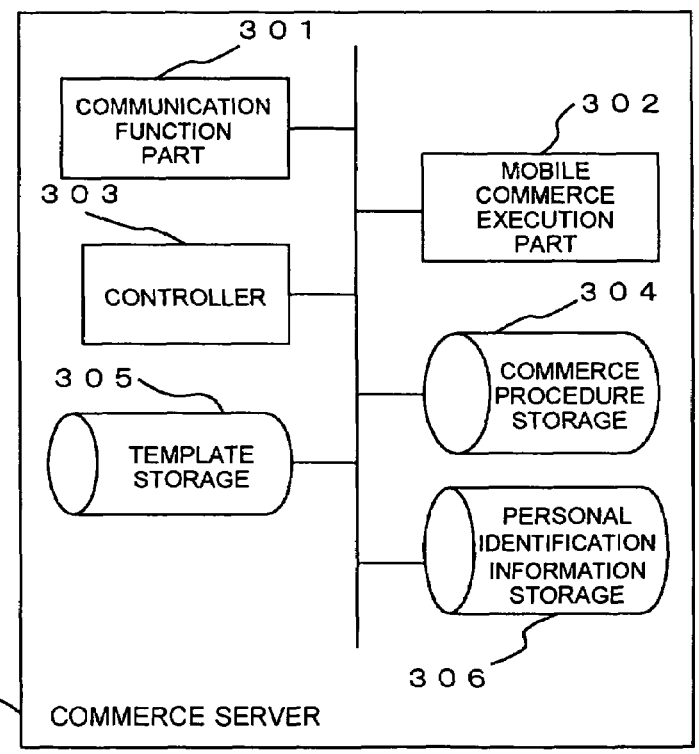
FIG. 17 is a block diagram showing the construction of a commerce server used in the electronic commerce system according to the fourth embodiment of the present invention.

FIG. 17 is a block diagram showing the construction of the commerce server 300 of the fourth embodiment. The commerce server 300 of this embodiment is of essentially the same construction as that of the second embodiment except for the presence of a personal identification information storage 306. The personal identification information storage 306 stores information for identifying the user of the mobile terminals 100*a* and 100*b*, and the fixed terminal 150*a*.

Figure 18:
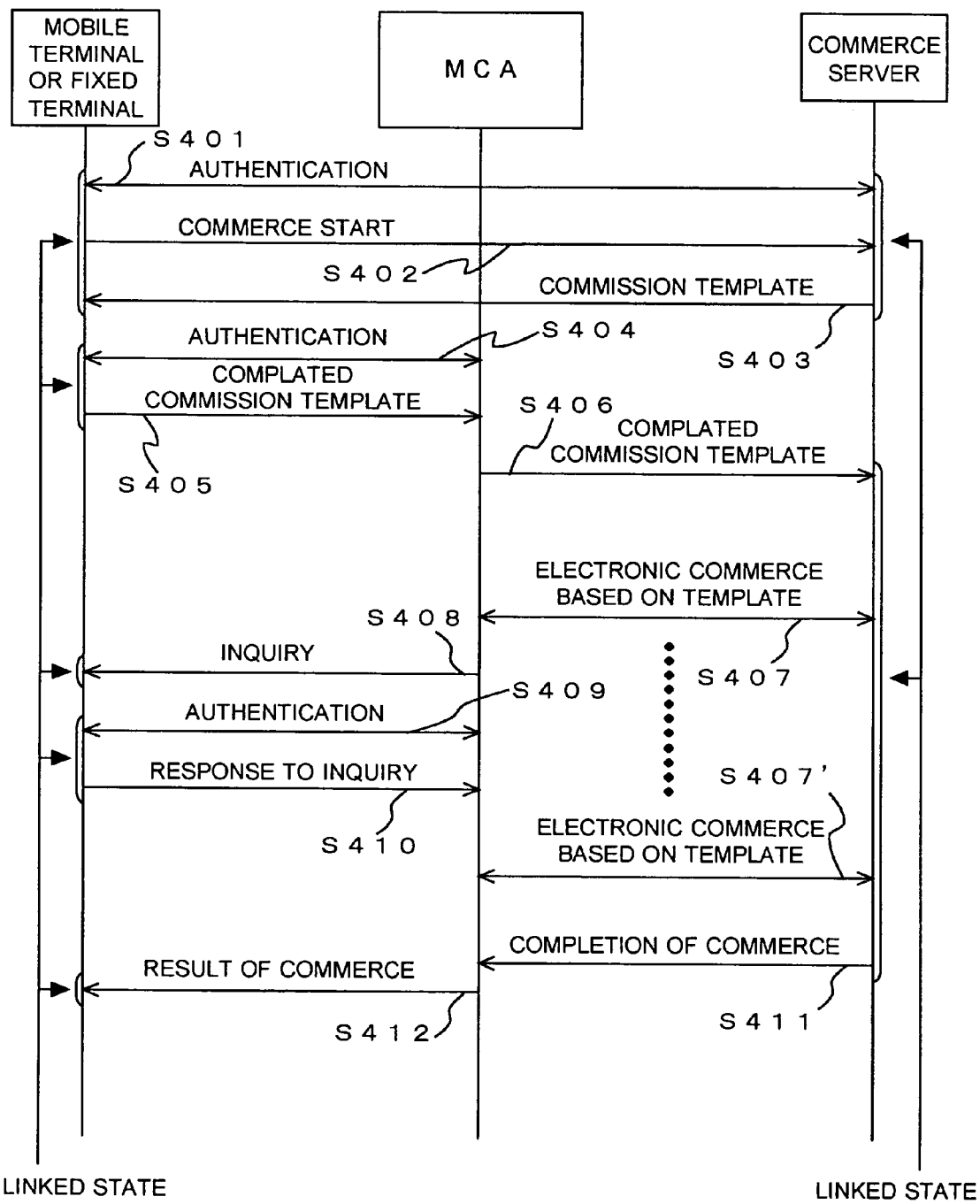
FIG. 18 is a sequence diagram showing the operation of the electronic commerce system according to the fourth embodiment of the present invention.

FIG. 18 is a sequence diagram showing the operation of the electronic commerce system of this embodiment. The operation of the electronic commerce system shown in FIG. 18 is in many respects basically similar to that of the second embodiment. However, a terminal that a customer is operating and the commerce server 300 authenticate one another (two-way authentication) prior to initiating electronic commerce. Besides, on the occasion when the terminal transmits information to the MCA 200, the terminal and the MCA 200 authenticate each other differently from the electronic commerce system of the first embodiment.

More specifically, before the terminal of the customer informs the commerce server 300 of the initiation of electronic commerce (step S 402), before the terminal sends the MCA 200 information respecting an order for an article or goods (step S405), and before the terminal sends the MCA 200 a response to an inquiry from the MCA 200 (step S410), the terminal and the MCA 200 or the commerce server 300 authenticate each other (steps S401, S404 and S409).

Since the MCA 200 authenticates the terminal of the customer based on his/her personal information, the MCA 200 can carry on electronic commerce even if the customer changes the terminal to use during the electronic commerce. Thereby, the customer can order an article with the mobile terminal at the place where he/she has gone, and receive the article using the fixed terminal after he/she returns home.

Additionally, because the terminal of the customer authenticates the MCA 200 prior to sending information thereto, it is possible to prevent unauthorized or third parties from obtaining customer information, such as a credit card number, illegally. As a result, the customer can commission the MCA 200 to conduct electronic commerce without worrying about leakage of his/her personal data or information.

While a full description has not been made of procedures for electronic commerce in the respective embodiments, the present invention is applicable to procedures according to any known electronic commerce method.

As set forth hereinabove, in accordance with the present invention, a mobile commerce agent is placed between a mobile terminal of a customer and a commerce server to conduct electronic commerce on behalf of the mobile terminal. Therefore, a stable communication line is provided between the mobile commerce agent and the commerce server, and the communication line of the mobile terminal may terminate at the mobile commerce agent. Thus, it is possible to continue electronic commerce even when communication between the mobile terminal and mobile commerce agent is cut off during the electronic commerce.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An electronic commerce system comprising:
   a group of information processing terminals including at least one mobile terminal capable of connecting to a mobile communications network;
   a commerce server connected to an information and communications network; and
   an agent connected to both the mobile communications network and the information and communications network, conducting electronic commerce for the mobile terminal so that a user of the mobile terminal purchases an article from the commerce server;
   wherein: each of the information processing terminals includes:
      an authorizing part for providing authorization for the agent to conduct electronic commerce for the information processing terminal; and
      an authorization information notifying part for notifying the agent of information on the authorization;
   the commerce server includes a procedure information notifying part for notifying the agent of information as to procedures for the electronic commerce; and
   the agent, at which the line of the mobile terminal terminates, includes:
      a first storage for storing the electronic commerce procedure information received from the commerce server;
      a second storage for storing the authorization information received from the information processing terminal; and
      an electronic commerce conducting part for, in response to a request from the information processing terminal, carrying out the procedures for the electronic commerce which the agent has the authorization to conduct according to the authorization information received from the information processing terminal based on the electronic commerce procedure information
   wherein: each information processing terminal further includes:
      a user authentication information obtaining part for obtaining user authentication information to identify its user;

a user authentication information notifying part for notifying the agent of the user authentication information; and an authenticating part for authenticating the agent that is to conduct the electronic commerce on behalf of the information processing terminal using a digital signature contained in a digital certificate obtained from the agent;

the agent further includes an identifying part for determining whether the user of the information processing terminal is the party concerned with the electronic commerce based on the user authentication information received from the information processing terminal;

wherein the information processing terminal is configured to determine whether the agent is authorized to conduct the electronic commerce for the information processing terminal; and wherein the agent is configured to determine whether the user of the information processing terminal is the party concerned with the electronic commerce so as to conduct the electronic commerce for the information processing terminal used by the party concerned with the electronic commerce.

2. The electronic commerce system claimed in claim 1, wherein:

the agent further includes an inquiring part for, in the case where the procedures for the electronic commerce involve a procedural step which the agent does not have the authorization to execute according to the authorization information, inquiring of the information processing terminal whether or not to execute the procedural step; and the information processing terminal further includes: an indicating part for, in response to the inquiry as to whether or not to execute the procedural step from the agent, indicating a message to the user to inquire whether or not to execute the procedural step; and a procedural step execution information notifying part for notifying the agent of information as to whether or not to execute the procedural step based on input provided by the user in response to the message.

3. The electronic commerce system claimed in claim 1, wherein:

the commerce server further includes a template information transmitting part for transmitting template information showing the electronic commerce procedure information and information necessary for having the agent carry out the procedures for the electronic commerce;

the information processing terminal further includes an input requesting part for indicating the template information to the user to request the user to input information necessary for having the agent carry out the procedures for the electronic commerce; and the agent is configured to receive notification of the electronic commerce procedure information together with the information input by the user in response to the request, and carries out the procedures for the electronic commerce based on the information notified by the information processing terminal.

4. The electronic commerce system claimed in claim 1, wherein the connection via the mobile communications network between the mobile terminal and the agent is established only while the mobile terminal is transmitting information to the agent and the agent is transmitting information to mobile terminal.

5. The electronic commerce system claimed in claim 1, wherein the agent is configured to transfer electronic data obtained by the electronic commerce to the information processing terminal through the mobile communications network or the information and communications network.

6. The electronic commerce system claimed in claim 1, wherein:

the connection via the mobile communications network between the mobile terminal and the agent is established only while the mobile terminal is transmitting information to the agent and the agent is transmitting information to mobile terminal; and the agent is configured to transfer electronic data obtained by the electronic commerce to the information processing terminal through the mobile communications network or the information and communications network.

7. An electronic commerce system comprising:

a group of information processing terminals including at least one mobile terminal capable of connecting to a mobile communications network;

a commerce server connected to an information and communications network; and an agent connected to both the mobile communications network and the information and communications network, conducting electronic commerce for the mobile terminal so that a user of the mobile terminal purchases an article from the commerce server;

wherein: each of the information processing terminals includes:

an authorizing part for providing authorization for the agent to conduct electronic commerce for the information processing terminal; and an authorization information notifying part for notifying the agent of information on the authorization;

the commerce server includes a procedure information notifying part for notifying the agent of information as to procedures for the electronic commerce; and the agent, at which the line of the mobile terminal terminates, includes:

a first storage for storing the electronic commerce procedure information received from the commerce server;

a second storage for storing the authorization information received from the information processing terminal; and an electronic commerce conducting part for, in response to a request from the information processing terminal, carrying out the procedures for the electronic commerce which the agent has the authorization to conduct according to the authorization information received from the information processing terminal based on the electronic commerce procedure information wherein: the agent further includes an inquiring part for, in the ease where the procedures for the electronic commerce involve a procedural step which the agent does not have the authorization to execute according to the authorization information, inquiring of the information processing terminal whether or not to execute the procedural step; and the information processing terminal further includes:

an indicating part for, in response to the inquiry as to whether or not to execute the procedural step from the agent, indicating a message to the user to inquire whether or not to execute the procedural step; and a procedural step execution information notifying part for notifying the agent of information as to whether or not to execute the procedural step based on input provided by the user in response to the message.

8. The electronic commerce system claimed in claim 7, wherein:
- the commerce server further includes a template information transmitting part for transmitting template information showing the electronic commerce procedure information and information necessary for having the agent carry out the procedures for the electronic commerce;
- the information processing terminal further includes an input requesting part for indicating the template information to the user to request the user to input information necessary for having the agent carry out the procedures for the electronic commerce; and
- the agent is notified of the electronic commerce procedure information together with the information input by the user in response to the request, and carries out the procedures for the electronic commerce based on the information notified by the information processing terminal.

9. The electronic commerce system claimed in claim 7, wherein the connection via the mobile communications network between the mobile terminal and the agent is established only while the mobile terminal is transmitting information to the agent and the agent is transmitting information to mobile terminal.

10. The electronic commerce system claimed in claim 7, wherein the agent is configured to transfer electronic data obtained by the electronic commerce to the information processing terminal through the mobile communications network or the information and communications network.

11. The electronic commerce system claimed in claim 7, wherein:
- the connection via the mobile communications network between the mobile terminal and the agent is established only while the mobile terminal is transmitting information to the agent and the agent is transmitting information to mobile terminal; and
- the agent is configured to transfer electronic data obtained by the electronic commerce to the information processing terminal through the mobile communications network or the information and communications network.

12. An electronic commerce system comprising:
- a group of information processing terminals including at least one mobile terminal capable of connecting to a mobile communications network;
- a commerce server connected to an information and communications network;
- and an agent connected to both the mobile communications network and the information and communications network, conducting electronic commerce for the mobile terminal so that a user of the mobile terminal purchases an article from the commerce server;

wherein: each of the information processing terminals includes:
- an authorizing part for providing authorization for the agent to conduct electronic commerce for the information processing terminal; and an authorization information notifying part for notifying the agent of information on the authorization;

the commerce server includes a procedure information notifying part for notifying the agent of information as to procedures for the electronic commerce; and the agent, at which the line of the mobile terminal terminates, includes:
- a first storage for storing the electronic commerce procedure information received from the commerce server; a second storage for storing the authorization information received from the information processing terminal; and an electronic commerce conducting part for, in response to a request from the information processing terminal, carrying out the procedures for the electronic commerce which the agent has the authorization to conduct according to the authorization information received from the information processing terminal based on the electronic commerce procedure information wherein: the commerce server further includes a template information transmitting part for transmitting template information showing the electronic commerce procedure information and information necessary for having the agent carry out the procedures for the electronic commerce;

the information processing terminal further includes an input requesting part for indicating the template information to the user to request the user to input information necessary for having the agent carry out the procedures for the electronic commerce; and the agent is configured to receive notification of the electronic commerce procedure information together with the information input by the user in response to the request, and is configured to carry out the procedures for the electronic commerce based on the information notified by the information processing terminal.

13. The electronic commerce system claimed in claim 12, wherein the connection via the mobile communications network between the mobile terminal and the agent is established only while the mobile terminal is transmitting information to the agent and the agent is transmitting information to mobile terminal.

14. The electronic commerce system claimed in claim 12, wherein the agent is configured to transfer electronic data obtained by the electronic commerce to the information processing terminal through the mobile communications network or the information and communications network.

15. The electronic commerce system claimed in claim 12, wherein:
- the connection via the mobile communications network between the mobile terminal and the agent is established only while the mobile terminal is transmitting information to the agent and the agent is transmitting information to mobile terminal; and
- the agent is configured to transfer electronic data obtained by the electronic commerce to the information processing terminal through the mobile communications network or the information and communications network.

16. An electronic commerce method applied to a system comprising: a group of information processing terminals including at least one mobile terminal capable of connecting to a mobile communications network; a commerce server connected to an information and communications network; and an agent connected to both the mobile communications network and the information and communications network, conducting electronic commerce for the mobile terminal so that a user of the mobile terminal purchases an article from the commerce server, wherein the line of the mobile terminal terminates at the agent, the electronic commerce method comprising the steps of:
- providing by the information processing terminal authorization for the agent to conduct electronic commerce for the information processing terminal;
- notifying by the information processing terminal the agent of information on the authorization;
- notifying by the commerce server the agent of information as to procedures for the electronic commerce;
- storing by the agent the electronic commerce procedure information received from the commerce server; and storing by the agent the authorization information received from the information processing terminal;

wherein, in response to a request from the information processing terminal, the agent carrying out the procedures for the electronic commerce which the agent has the authorization to conduct according to the authorization information received from the information processing terminal based on the electronic commerce procedure information, and transfering the electronic data obtained by the electronic commerce to the information processing terminal;

wherein: each information processing terminal obtaining user authentication information to identify its user to notify the agent of the user authentication information, and authenticating the agent that is to conduct the electronic commerce on behalf of the information processing terminal using a digital signature contained in a digital certificate obtained from the agent;

the agent determining whether the user of the information processing terminal is the party concerned with the electronic commerce based on the user authentication information received from the information processing terminal;

wherein the information processing terminal determining whether the agent is authorized to conduct the electronic commerce for the information processing terminal; and wherein the information processing terminal determining whether the agent is authorized to conduct the electronic commerce, and the agent determining whether the user of the information processing terminal is the party concerned with the electronic commerce so as to conduct the electronic commerce for the information processing terminal used by the party concerned with the electronic commerce.

17. The electronic commerce method claimed in claim 16, wherein:

in the case where the procedures for the electronic commerce involve a procedural step which the agent does not have the authorization to execute according to the authorization information, the agent inquires of the information processing terminal whether or not to execute the procedural step; and in response to the inquiry as to whether or not to execute the procedural step from the agent, the information processing terminal indicates a message to the user to inquire whether or not to execute the procedural step, and notify the agent of information as to whether or not to execute the procedural step based on input provided by the user in response to the message.

18. The electronic commerce method claimed in claim 17, wherein:

the commerce server transmits template information showing the electronic commerce procedure information and information necessary for having the agent carry out the procedures for the electronic commerce at the first step;

the information processing terminal indicates the template information to the user to request the user to input information necessary for having the agent carry out the procedures for the electronic commerce; and the agent is notified of the electronic commerce procedure information together with the information input by the user in response to the request, and carries out the procedures for the electronic commerce based on the information notified by the information processing terminal.

19. The electronic commerce method claimed in claim 18, wherein when the article of commerce is electronic data, the agent transfers the electronic data obtained by the electronic commerce to the information processing terminal at the last step.

20. The electronic commerce method claimed in claim 17, wherein when the article of commerce is electronic data, the agent transfers the electronic data obtained by the electronic commerce to the information processing terminal at the last step.

21. The electronic commerce method claimed in claim 16, further comprising:

the commerce server transmitting template information showing the electronic commerce procedure information and information necessary for having the agent carry out the procedures for the electronic commerce at the first step;

the information processing terminal indicating the template information to the user to request the user to input information necessary for having the agent carry out the procedures for the electronic commerce; and the agent receiving notification of the electronic commerce procedure information together with the information input by the user in response to the request, and carrying out the procedures for the electronic commerce based on the information notified by the information processing terminal.

22. The electronic commerce method claimed in claim 21, wherein when the article of commerce is electronic data, the agent transfers the electronic data obtained by the electronic commerce to the information processing terminal at the last step.

23. The electronic commerce method claimed in claim 16, wherein when the article of commerce is electronic data, the agent transfers the electronic data obtained by the electronic commerce to the information processing terminal at the last step.

24. An electronic commerce method applied to a system comprising: a group of information processing terminals including at least one mobile terminal capable of connecting to a mobile communications network; a commerce server connected to an information and communications network; and an agent connected to both the mobile communications network and the information and communications network, conducting electronic commerce for the mobile terminal so that a user of the mobile terminal purchases an article from the commerce server, wherein the line of the mobile terminal terminates at the agent, the electronic commerce method comprising the steps of:

providing by the information processing terminal authorization for the agent to conduct electronic commerce for the information processing terminal;

notifying by the information processing terminal the agent of information on the authorization;

notifying by the commerce server the agent of information as to procedures for the electronic commerce;

storing by the agent the electronic commerce procedure information received from the commerce server; and storing by the agent the authorization information received from the information processing terminal;

in response to a request from the information processing terminal, the agent carrying out the procedures for the electronic commerce which the agent has the authorization to conduct according to the authorization information received from the information processing terminal based on the electronic commerce procedure information, and transferring the electronic data obtained by the electronic commerce to the information processing terminal;

wherein: in the case where the procedures for the electronic commerce involve a procedural step which the agent does not have the authorization to execute according to the authorization information, the agent inquires of the information processing terminal whether or not to execute the procedural step; and in response to the inquiry as to whether or not to execute the procedural step from the agent, the information processing terminal indicating a message to the user to inquire whether or not to execute the procedural step, and notifying the agent of information as to whether or not to execute the procedural step based on input provided by the user in response to the message.

25. The electronic commerce method claimed in claim 24, wherein:

the commerce server transmits template information showing the electronic commerce procedure information and information necessary for having the agent carry out the procedures for the electronic commerce at the first step;

the information processing terminal indicates the template information to the user to request the user to input information necessary for having the agent carry out the procedures for the electronic commerce; and the agent is notified of the electronic commerce procedure information together with the information input by the user in response to the request, and carries out the procedures for the electronic commerce based on the information notified by the information processing terminal.

26. The electronic commerce method claimed in claim 25, wherein when the article of commerce is electronic data, the agent transfers the electronic data obtained by the electronic commerce to the information processing terminal at the last step.

27. The electronic commerce method claimed in claim 24, wherein when the article of commerce is electronic data, the agent transfers the electronic data obtained by the electronic commerce to the information processing terminal at the last step.

28. An electronic commerce method applied to a system comprising: a group of information processing terminals including at least one mobile terminal capable of connecting to a mobile communications network; a commerce server connected to an information and communications network; and an agent connected to both the mobile communications network and the information and communications network, conducting electronic commerce for the mobile terminal so that a user of the mobile terminal purchases an article from the commerce server, wherein the line of the mobile terminal terminates at the agent, the electronic commerce method comprising the steps of:

providing by the information processing terminal authorization for the agent to conduct electronic commerce for the information processing terminal;

notifying by the information processing terminal the agent of information on the authorization;

notifying by the commerce server the agent of information as to procedures for the electronic commerce;

storing by the agent the electronic commerce procedure information received from the commerce server; and storing by the agent the authorization information received from the information processing terminal;

in response to a request from the information processing terminal, the agent carrying out the procedures for the electronic commerce which the agent has the authorization to conduct according to the authorization information received from the information processing terminal based on the electronic commerce procedure information, and transferring the electronic data obtained by the electronic commerce to the information processing terminal;

wherein: the commerce server transmitting template information showing the electronic commerce procedure information and information necessary for having the agent carry out the procedures for the electronic commerce at the first step;

the information processing terminal indicating the template information to the user to request the user to input information necessary for having the agent carry out the procedures for the electronic commerce; and the agent receiving notification of the electronic commerce procedure information together with the information input by the user in response to the request, and carrying out the procedures for the electronic commerce based on the information notified by the information processing terminal.

29. The electronic commerce method claimed in claim 28, wherein when the article of commerce is electronic data, the agent transfers the electronic data obtained by the electronic commerce to the information processing terminal at the last step.

* * * * *